United States Patent

[11] 3,611,283

[72] Inventors  Hans Joachim Anders;
               Heinz Hahm, both of Frankfurt Main, Germany
[21] Appl. No. 805,124
[22] Filed     Mar. 7, 1969
[45] Patented  Oct. 5, 1971
[73] Assignee  International Telephone and Telegraph Corporation
               New York, N.Y.
[32] Priority  Mar. 8, 1968
[33]           Germany
[31]           P 16 55 483.9

[54] BRAKE-WEAR-INDICATING SYSTEM
     9 Claims, 5 Drawing Figs.
[52] U.S. Cl. .................................................... 340/52 A,
                                                                200/61.44
[51] Int. Cl. ...................................................... B60t 17/22
[50] Field of Search .......................................... 340/52 B,
                                                              52 A; 200/61.4

[56]              References Cited
                UNITED STATES PATENTS
3,385,256   5/1968  Forbush ....................... 116/67

3,440,604   4/1969  Phillips ......................... 340/52
3,456,236   7/1969  Labartino et al. ............. 340/52
3,479,640  11/1969  Pyma ............................ 340/69

Primary Examiner—John W. Caldwell
Assistant Examiner—Howard Cohen
Attorneys—C. Cornell Remsen, Jr., Walter J. Baum and Paul W. Hemminger ABSTRACT: An indicating system for the wear of the lining of the brakeshoe of a disk brake in which the brakeshoe carries a contact which, upon substantial frictional erosion of the brake lining, engages a second contact resiliently during advance of the brakeshoe whereby the resilient interengagement of the contacts maintains an electrical connection after release of the brake. The contacts are connected in circuit with the warning lamp on the dashboard of the vehicle. The brakeshoe contact is a conductive member encased in a wearable (synthetic resin) insulating shell embedded in the lining material and exposed by contact with the disk, to establish an electrical connection, after a predetermined amount of brakeshoe wear. The resilient contact member of the brakeshoe lies outside the lining and engages a fixed portion of the brake housing, e.g., the spring clip holding the brakeshoes in place.

PATENTED OCT 5 1971

INVENTORS,
HANS J. ANDERS
HEINZ HAHM
BY
Karl G. Ross
ATTORNEY

PATENTED OCT 5 1971

INVENTOR.
HANS J. ANDERS
BY HEINZ HAHM
*Karl F. Ross*
ATTORNEY

3,611,283

BRAKE-WEAR-INDICATING SYSTEM

Our present invention relates to an indicating system for disk brakes and, more particularly, to an arrangement for warning the operator of a motor vehicle of the wear or erosion of the brake lining beyond a predetermined degree.

While numerous warning systems have been provided to indicate all types of brake failure, such systems have generally been complex or inadequate. It has been proposed, for example, in a system in which the chassis or body of the vehicle is a common terminal for an electrical system (e.g., one pole of the battery is connected to the vehicle body) to provide a system for indicating brake wear in which a contact is encased in a wearable sheath of electrically insulating material in a brakeshoe of the disk and preferably embedded in the brake-lining material. Upon excessive erosion or wear of the brake-lining material, the sheath, e.g., of synthetic resin material, engages the disk during application of the brake and is then, in turn, eroded to bring the contact member into engagement with the disk and thereby close an electrical circuit to a warning lamp or other indicator on the instrument panel or dashboard of the vehicle. The indicator is energized momentarily, i.e., for the duration of brake application, but is extinguished upon release of the brake. Since the attention of the operator during braking is usually directed to activities on the road or street ahead of the vehicle, he frequently fails to note the energization of the indicator and the fact that the brake-lining has worn excessively.

It is the principal object of the present invention to overcome this disadvantage of earlier systems and provide an improved warning system for the lining wear of a disk brake which cannot be overlooked by the vehicle operator and yet is of low cost and requires little modification of the vehicle structure.

Another object of this invention is to provide a system for alerting a vehicle operator to impending failure of a disk brake as a result of excessive brake-lining wear which does not require complex electromechanical, electronic or other holding circuitry or components and which can be installed on existing vehicles having warning circuits, without difficulty or significant additional cost.

These objects and others which will become apparent hereinafter are attained, in accordance with the present invention, by providing a contact member in the brakeshoe of a disk brake which has a portion resiliently engageable with a countercontact of the brake housing upon reduction of the brake-lining thickness to a predetermined minimum level, the resilient member being deflectable upon advance of the brakeshoe toward the disk through the brake play or stroke but maintaining engagement even after the brake is released, thereby continuing the energization of of the indicator or signaling device even after the vehicle operator has withdrawn his foot from the brake pedal. Hence the disadvantages of momentary operations of the signaling device are eliminated.

More specifically, our invention provides a waring system for a disk-brake arrangement in which the brake housing is conductively connected to the vehicle body to which one pole of the ignition battery is tied as a common ground for all or most of the electrical devices used in the vehicle. The other terminal of the battery is connected through an indicator on the instrument panel or dashboard of the vehicle, preferably a warning lamp, although an electrical-acoustical transducer producing an audible signal may also be employed to supplement the lamp or in place thereof. The other side of the electrical indicator is connected to the contact member of the brakeshoe which has the configuration described above. Advantageously, a dual contact is provided by constituting the contact member of the brakeshoe with a conductive portion embedded in the brake-lining material and preferably surrounded by a sheet of wearable synthetic resin through which the contact member can engage the disk upon erosion of the brake-lining material and of the sheet with the advance of the brakeshoe against the disk. Consequently, a failure of the resilient contact arrangement will nevertheless not affect the indication produced by the embedded contact, although only momentary warning may be given by the lamp.

According to a further feature of this invention, the brakeshoe contact has a bent portion forming a resilient member lying outside of the periphery of the pad of lining material and is engageable with a part of the brake housing in its path upon advance but also outwardly of the periphery of the brakeshoe. The bent portion is preferably disposed along one of the guide lugs of the brakeshoe through which the brakeshoe guiding and holding pins extend, the countercontact portion of the housing being then an element disposed along these pins or rods. Alternatively, the countercontact of the housing may be bent into a resiliently deformable portion engageable with the rigid portion of the brakeshoe contact, so that engagement is made even after the brake is released.

In a particularly advantageous construction of the brake in accordance with the present invention, the countercontact of the housing is a nonshiftable spring clip or cross spring which retains the brakeshoes and usually spans the brakeshoe-access opening or window in the yoke.

The above and other objects, features and advantages of the present invention will become more readily apparent from the following description, reference being made to the accompanying drawing in which.

Figure 1:
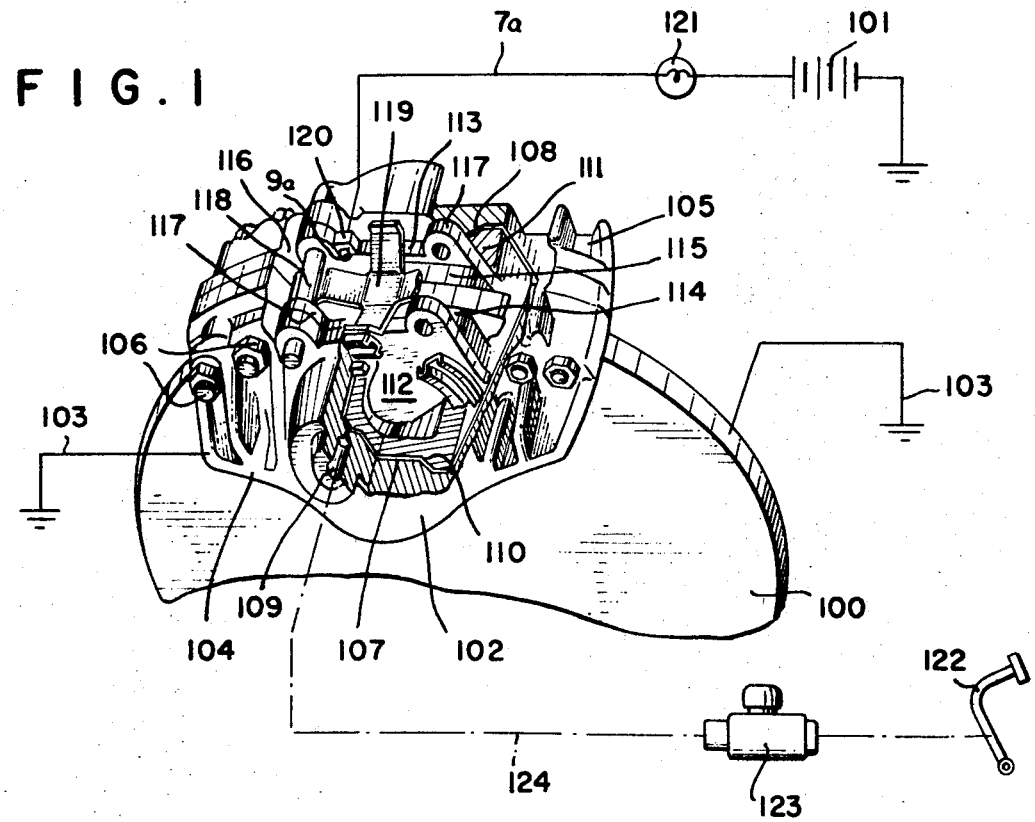
FIG. 1 is a perspective view, partly broken away, of a disk brake and warning system embodying the invention.

In FIG. 1 of the drawing, we have diagrammatically illustrated a disk brake of an automotive vehicle which embodies this invention. The disk brake has a brake disk 100 connected to the tire-carrying wheel disk of one of the vehicle wheels and journaled on the vehicle body in the usual manner. As part of the vehicle body, the disk 100 can be considered to be connected to the common ground of a battery 101 whose terminal is tied to the chassis. The common electrical connection between the disk 100 and the brake housing 102 with the battery 101 is represented by the lines 103.

The brake housing 102 is mounted in the usual manner to the flange of an axle housing (not shown) and comprises a pair of brake halves 104, 105 bolted together at 106 to form a caliper the lobes of which are formed with hydraulic wheel-brake cylinders 107, 108 to which brake fluid is admitted at a fitting 109. The cup-shaped pistons 110, 111 bear upon the backing plates 112 and 113 of a pair of brakeshoes flanking the disk 100 and frictionally engageable therewith. The backing plates 112 and 113 carry pads 114 and 115 of the brake-lining material which wears away and eventually renders the brake useless.

The caliper of brake housing 102 is open radially outwardly at 116 to form a window through which the brakeshoes can be removed. The backing plates of the brakeshoes have lugs 117 which slidably engage a pair of removable guide rods 118 (one shown) spanning the window and serving as retaining members for a cross spring or clip 119 designed to hold the brakeshoes movably against undue play and itself fixed in place on the housing.

According to the principles of the present invention, the brakeshoes, which may have internal contact portions as described in connection with FIGS. 2-4, have a resilient portion 9 *a* protruding from a body of electrically insulating material 120 in the direction of the clip 119 and engageable therewith. The spring contact 9 *a* is connected via a wire 7 *a* with one side of a lamp 121 mounted upon the dashboard or panel of the vehicle, the other side of the lamp being connected to the nongrounded terminal of the battery. Upon resilient contact of member 9 *a* with the spring clip 119, the bent portion is deformed to the extend of the brake play and maintains engagement with the spring clip even when the brake is released. The brake-actuating mechanism is represented by the pedal 122 which operates a master cylinder 123 supplying fluid to the fitting via a line 124. When the brake pedal is released, the lamp 121 remains illuminated upon excessive wear of the lining.

Figure 2:
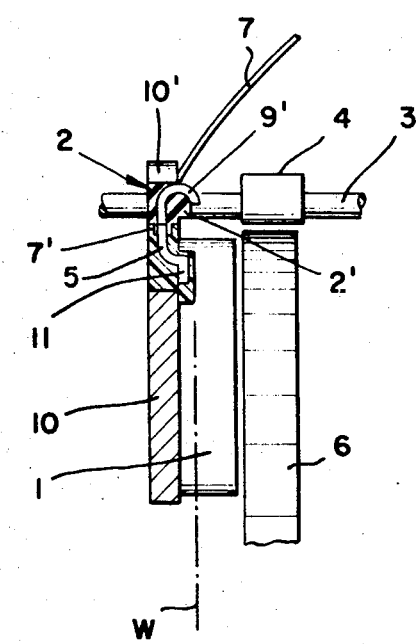
FIG. 2 is an elevational view, partly broken away, illustrating the structure of a brakeshoe contact according to the invention.

In the diagram of FIG. 2, it can be seen that the brake system makes use of a brakeshoe the lining of which is represented at 1 and is engageable with the disk portion 6 of disk 100. The backing plate 10 carrying the lining 1 also has a lug 10′ whereby the brakeshoe can be guided along the rods 3, here shown as received in an opening in a brake-housing portion 4 intermediate the two yoke halves. The contact 5, to which the wire 7 is attached by a crimped lug 7′, has a forwardly projecting contact portion 11 imbedded in a body 2 of synthetic resin and extending into the lining material 1. With erosion of the brake-lining material to the plane represented by the dot-dash line W, erosion of the synthetic-resin material overlying the contact portion 11 begins. When the contact portion 11 engages the disk 6, the lamp is illuminated as has been described in connection with FIG. 1. A bent portion 9 externally of the body of brake-lining material projects from the insulating block 2′, here shown to be constituted of rubber or other resiliently compressible material to lend resilience to the bent portion 9. The latter engages the rod support 4 when the brake-lining material wears below plane W and is deflected inwardly through at least the brake play so that, upon releasing of the brake, the contact between member 9 and member 4 is maintained by an expansion of the rubber block 2. The contact member 5 is insulated by the sheath 2 and the rubber block 2′ from the metal backing plate 10.

Figure 3:
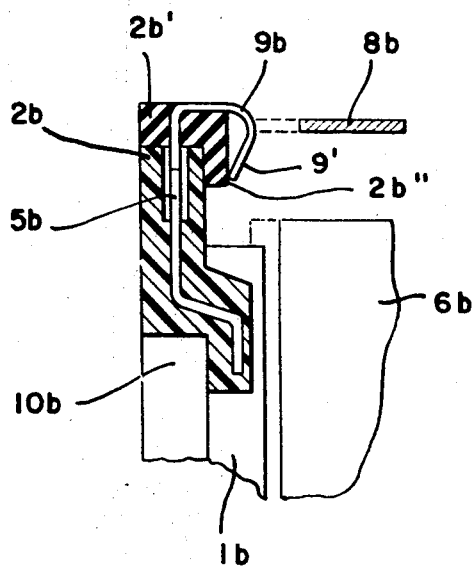
FIG. 3 is a view similar to FIG. 2 but drawn to a larger scale, showing another embodiment of the invention.
Figure 4:
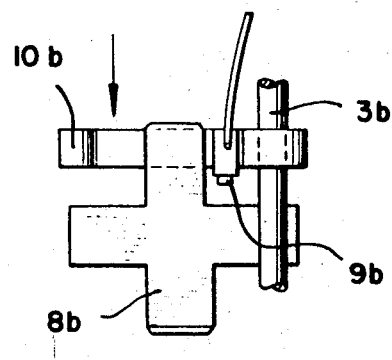
FIG. 4 is a plan view of the arrangement of FIG. 3.
Figure 5:
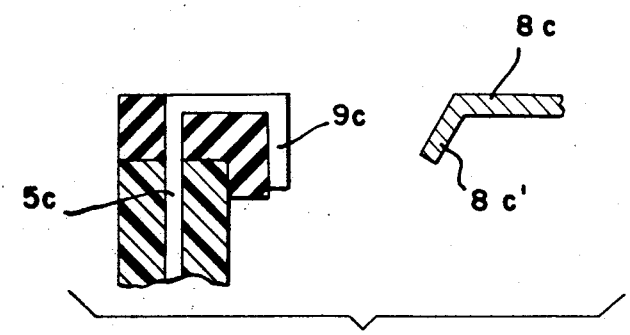
FIG. 5 is detail view of another embodiment of the invention.

In FIG. 3, we have shown an alternative arrangement wherein the downwardly bent portion 9 b of the contact 5 b carried by the brakeshoe, is resiliently deflectable solely by virtue of the bent and the engagement of the free end 9 b′ thereof upon the surface 2 b″ of a rubber block 2 b′ which, together with sheath 2 b insulates the contact 5 b from the backing plate 10 b of the brakeshoe. The brake lining is represented at 1 b and the contact is provided with a conductor or lead as shown at 7 or 7 a. In this embodiment, however, the contact portion 9 b is engageable with a lateral edge of a cross ring or spring clip 8 b, corresponding to the member 119 previously described. In the contact position, the disk portion 66 of disk 100 and the spring 8 b assume, with respect to the brakeshoe, the positions illustrated in dot-dash lines in FIG. 3. In FIG. 5, we have shown a variation of this system wherein the cross spring or clip 8 c has a bent portion or tongue 8 c′ and thus is resiliently deflectable whereas member 9 c of contact 5 c is substantially stiff. In operation, the results previously described with respect to continued operation of the indicator are obtained with the systems of both FIGS. 2 and 3. In FIG. 4, of course, the rest of the clip 8 b is apparent and its relationship with the guide rod 3 b is shown.

The improvement described and illustrated is believed to admit of many modifications within the ability of persons skilled in the art, all such modifications being considered within the spirit and scope of the invention except as limited by the appended claims.

We claim:

1. A vehicle-brake system comprising a rotatable brake surface, a brake-housing member disposed along said rotatable brake surface, a brakeshoe having a backing plate and a pad of brake-lining material mounted on said backing plate and shiftable on said housing member toward and away from said surface for frictional contact therewith, said pad having a periphery, electrical indicator means for warning a vehicle operator of excessive brake-lining wear, circuit means connected to said indicator means and to said housing for energizing said indicator means, and a strip-type deflectable contact member mounted on said brakeshoe beyond the periphery of said pad and electrically insulated from said backing plate and resiliently engageable with a portion of said housing lying outwardly of said periphery of said brake-lining material in a direction transverse to the direction of displacement of said brakeshoe, said strip-type deflectable contact members being connected to said circuit means for energizing said indicator means upon engagement with said housing portion and maintaining the energization of said indicator means upon withdrawal of said brakeshoe from said surface through the play of the brakeshoe, said contact member having a portion embedded in said brake-lining material and lying between said backing plate and said surface and exposed upon excessive wear thereof for engagement with said surface, said surface being in conductive relationship with said housing.

2. The improvement defined in claim 1 wherein said portion of said contact member is embedded and encased in a wearable synthetic-resin sheath surrounded by said lining material, said sheath being frictionally abraded by said surface prior to engagement of said portion of said contact member therewith.

3. The improvement defined in claim 2 wherein said contact member has a resilient tongue engageable with said portion of said housing upon advance of said brakeshoe toward said surface.

4. The improvement defined in claim 2 wherein said portion of said housing has a resilient contact engageable by said contact member.

5. The improvement defined in claim 1 wherein said system includes a disk brake, said housing is a brake yoke and said surface is a brake disk passing through said yoke, said disk brake further including guide means on said yoke slidably engaging said brakeshoe for retaining same for movement toward and away from said disk, and a cross spring on said housing engaging said guide means and bearing upon said brakeshoes, said contact member being encapsulated in an electrically insulating body and having a contact portion projecting from said body outside the brake-lining material and a further portion encased in a synthetic-resin sheath received in said brake-lining material for exposure and engagement with said disk upon excessive wear of said brake-lining material.

6. The improvement defined in claim 5 wherein said contact portion is bent to form a resilient tongue engageable with said portion of said housing.

7. The improvement defined in claim 6 wherein said portion of said housing is said cross spring.

8. The improvement defined in claim 5 wherein said portion of said housing is resiliently yieldable.

9. The improvement defined in claim 5 wherein said indicator means is a lamp mounted upon the instrument panel of said vehicle, said circuit means including a battery having one terminal grounded to the vehicle body and another terminal connected to one side of said lamp, and means for connecting the other side of said lamp to said contact member.